United States Patent [19]

Nestich et al.

[11] 4,453,560

[45] Jun. 12, 1984

[54] HYDRAULICALLY BALANCED VALVE MECHANISM

[75] Inventors: R. Frank Nestich, Glenmont; Burton L. Preston, Mansfield, both of Ohio

[73] Assignee: Interpace Corporation, Parsippany, N.J.

[21] Appl. No.: 305,168

[22] Filed: Sep. 24, 1981

[51] Int. Cl.³ .......................... F16K 31/26; E03B 7/08
[52] U.S. Cl. ..................................... 137/312; 137/414; 137/425; 137/426; 137/436; 137/450; 251/120
[58] Field of Search ............... 137/414, 425, 426, 429, 137/435, 436, 438, 445, 450, 451, 312; 251/118, 120

[56] References Cited

U.S. PATENT DOCUMENTS

| 951,172 | 3/1910 | Biedenmeister | 137/450 |
|---|---|---|---|
| 2,271,419 | 1/1942 | Egan | 137/450 |
| 2,644,479 | 7/1953 | Rowley | 137/312 |
| 2,799,290 | 7/1957 | Svirsky | 137/436 |
| 3,144,875 | 8/1964 | Goldtrap | 137/414 |
| 3,285,277 | 11/1966 | Goldtrap | 137/414 |
| 3,554,219 | 1/1971 | Hudson | 137/414 |
| 3,994,313 | 11/1976 | Brandelli | 137/451 |

FOREIGN PATENT DOCUMENTS

| 2262727 | 6/1974 | Fed. Rep. of Germany | 137/312 |
|---|---|---|---|
| 89907 | 8/1937 | Sweden | 137/450 |
| 479241 | 2/1938 | United Kingdom | 137/435 |

Primary Examiner—George L. Walton

[57] ABSTRACT

The present invention is directed to a hydraulically balanced ballcock (10). A unique valve element (60) is translationally slidable within a valve housing (22) provided in the body (11) of the ballcock (10). A washer (74) received on the head (70) of the piston (61) in the valve element (60) moves in and out of engagement with a valve seat (85) presented from the valve housing (22) to effect closure and opening of the ballcock (10). A bore (95) extends through the piston (61) and stem portion (62) of the valve element (60) to communicate with a control chamber (125). Radial orifices (98 to 101) through a nozzle (73) that extends forwardly of the piston head (70) and through the washer (74) are located to communicate the pressure resulting from the venturi effect of fluid flow between the washer (74) and the seat (85) to the control chamber (15) by virtue of the bore (95). A metering pin (120) effects a time delay in the transmission of pressure to the control chamber (125) through bore (95), and the axial orifice (96) in nozzle (73) regulates the degree of the pressure differential. Passageways (75) vent the rear of the washer (74) to retain it in situ without a mechanical means. A support ring (111) is rotatably received on the valve housing (22) to permit tightening of the end cap (114) onto the housing (22) without deleterious effect on a rolling diaphragm (104) secured thereby, and the float (31) and counter weight (26) are uniquely adjustable and are operably connected to the valve element (60) by a relatively short lever (40).

16 Claims, 9 Drawing Figures

HYDRAULICALLY BALANCED VALVE MECHANISM

TECHNICAL FIELD

The present invention relates generally to a hydraulically balanced valve mechanism.

More particularly, the present invention relates to valve mechanisms which incorporate a unique valve element that utilizes the hydraulic pressure of the water supply system to assist in maintaining its statically open and statically closed postitions as well as to assist in effecting movement of the valve element between its two static positions. In addition, the present invention relates to a valve mechanism that is particularly adapted to be incorporated in a ballcock so that the latter can be of compact, adjustable configuration to facilitate usage in conjunction with flush tanks having a wide variety of sizes, shapes and internal arrangements.

BACKGROUND ART

The closest prior art is epitomized by the disclosure set forth in U.S. Pat. No. 951,172 which issued on Mar. 8, 1910. That patent clearly discloses incorporating an axial passage through the valve element to equalize the pressure acting on the opposite ends thereof so that the spindle forming the valve element can be more easily translated to effect opening and closing of the valve mechanism—specifically in the environment of a ballcock. At any given line pressure the prior art construction can be designed to work quite adequately, but it has been found that the valve will not open or close over a wide range of line pressures unless a full size ballfloat and lever are used, and even then as the line pressure increases the valve not only becomes progressively more difficult to open but also snaps more quickly closed, which produces relatively severe water hammer within the normal range of line pressures currently encountered.

Thus, the aforesaid U.S. Pat. No. 951,172 requires a rather extensive space within which to operate most effectively. Moreover, the prior art discloses the necessity of employing some mechanical means by which to retain the sealing washer in situ.

SUMMARY OF THE INVENTION

It is, therefore, a primary object of the present invention to provide a valve mechanism which is hydraulically assisted not only in maintaining its open and closed positions but is also hydraulically assisted in moving between the open and closed positions.

It is another object of the present invention to provide a valve mechanism, as above, which will operate efficiently, and effectively, without water hammer, over a wide range of hydraulic line pressures.

It is a further object of the present invention to provide a valve mechanism, as above, that is particularly adapted to be incorporated in a ballcock, which, because of the hydraulic forces, obviates the necessity for employing a long lever arm with a remote ball float and thereby achieves a compact configuration which makes it readily adaptable for use with flush tanks having a wide variety of sizes, shapes and internal arrangements.

It is a still further object of the present invention to provide a ballcock, as above, which incorporates an adjustable float and counter weight assembly by which to adjust not only the maximum height of the water level within the flush tank but also the height to which the water level will drop before the ballcock will open to admit replenishing flow from the supply line.

It is an even further object of the present invention to provide a ballcock, as above, in which the seal washer is retained on the valve element solely by differential hydraulic pressure thereagainst.

It is yet another object of the present invention to provide a ballcock, as above, which incorporates a rolling diaphragm seal between the valve element and the housing within which it operates as well as a unique support arrangement therefor to prevent deleterious deformation of the rolling diaphragm when a retaining means is screwed into clamping engagement with the mounting rim on the rolling diaphragm.

These and other objects, together with the advantages thereof over existing and prior art forms which will become apparent from the following specification, are accomplished by means hereinafter described and claimed.

In general, a ballcock assembly embodying a valve mechanism exemplifying the concept to the present invention has a body which has at least a shank portion and a valve housing. The ballcock is received within a tank which provides the flush water reservoir, and the shank portion extends through, and is sealingly secured to, the bottom wall of the flush tank.

Exteriorly of the tank the shank portion is connected to a water supply line. Water from the supply line selectively flows through the shank portion and into the valve housing by virtue of an inlet passage. An exhaust port in the valve housing permits the flow of water from the valve housing into the flush tank.

The unique valve element itself generally comprises a piston and a stem portion that are translationally slidable within a piston chamber, or cylinder, provided within the valve housing. A float means is operatively connected to the valve element for initiating translational movement thereof.

A valve seat is provided within the valve housing and surrounds the inlet passage as it communicates with the valve housing from the shank portion. As such, the valve seat is appropriately located between the exhaust port and the inlet passage through the shank portion.

The valve element further incorporates a nozzle that projects axially outwardly from the piston. A washer is mounted on the end of the piston and surrounds the nozzle such that translational movement of the valve element moves the washer into, and out of, sealing engagement with the valve seat.

A bore extends axially of said piston and stem portion. At least one orifice, which opens radially through the nozzle, communicates with the bore. The bore also opens axially through the rear of the stem portion to communicate with a control chamber. The control chamber effects the application of fluid pressure axially against the stem portion selectively to resist or to augment, to varying degrees, the resultant axial pressure—the combined mechanical pressure applied by the float arrangement and the hydraulic press, within the control chamber—applied against the piston.

It should be appreciated that when the valve is open the one or more radial orifices are positioned in sufficient proximity to the fluid flow between the washer and the valve seat that the venturi effect created by that flow will reduce the fluid pressure at the radial orifices during a substantial portion of the distance through which the valve element translationally moves. The pressure at the orifice is communicated via the bore to the control chamber. Thus, when the valve is in the closed position the fluid pressure at the piston is transmitted via the bore to the control chamber without reduction. However, when the valve is open and fluid flow between the washer and valve seat exists the fluid pressure transmitted to the control chamber is reduced below the fluid pressure at the piston because of the venturi effect.

The axial pressures applied to the piston also vary depending on whether the valve is open or closed. When the valve is open the fluid pressure is exerted on the entire surface of the valve element presented by the piston within the piston chamber, but when the valve is closed the valve seat limits the surface area of the piston which is exposed to the fluid pressure in the inlet passage. Thus, when the valve is open the axial force on the piston is greatest because of the larger surface area on the face of the piston that is exposed.

These principles work together to provide the hydraulic forces that maintain the valve in the statically open and closed positions. When the valve is closed the fluid pressure is the same at both the valve seat area and in the control chamber because there is no flow and thus no venturi effect at the radial orifices. Inasmuch as the effective area of the stem against which the pressure in the control chamber acts is greater than the surface area of the piston described by the valve seat, the net resultant force on the valve element acts to keep the piston against the valve seat.

As compared to the statically closed position of the valve element, there are two distinct differences in the application of hydraulic forces against the valve element when it is in its statically open position. First, the entire area of the piston is exposed to the fluid pressure in the inlet passage. This is significant because the area of the piston is greater than the effective area of the stem against which the pressure in the control chamber acts. Second, because fluid is now flowing, a venturi effect is created. This results in a lowering of the pressure in the control chamber acting against the stem. Thus, in the open position there is a relatively high fluid pressure acting on the piston area and a lower fluid pressure acting on the smaller stem area effecting a net resultant force on the valve element which tends to move it away from the valve seat.

In shifting from open to closed valve positions the net hydraulic forces continue to act on the valve element, but to a lesser degree as it progresses to the closed position unit a balanced neutral point is reached.

Conversely, in shifting from its closed to its open position the net hydraulic forces also act on the valve element to a lesser degree as it progresses to its open position until a balanced neutral point is reached.

Movement beyond the neutral point in either direction results in a shift in direction of the net hydraulic forces, so that instead of resisting the float (counter weight) the net hydraulic forces acting on the valve element thereafter hydraulically assist the float (counter weight) in moving the valve element to either the closed or the open position.

The time span during which the valve seat translationally moves may be increased, when necessary to preclude water hammer, by the use of a metering pin to restrict the passage of fluid through the bore within the piston and stem portions and into the control chamber.

In addition, the pressure differential between the control chamber and the pressure at the radial orifices may be reduced when necessary to reduce water hammer by the use of a pressure regulator in the form of an axial bore through the nozzle which also communicates with the axial bore through the piston and stem portions.

Additional features hereinafter described, and explained, in detail relate to the use of hydraulic pressure alone to maintain the washer in situ as well as the adjustable, and compact, float configuration supported on a pillar which extends upwardly from the shank portion and the novel means by which rotatably to clamp the relatively delicate rolling diaphragm in place without any deleterious effects.

One preferred embodiment of the ballcock assembly incorporating the concepts of the present invention is shown by way of example in the accompanying drawings and is described in detail without attempting to show all of the various forms and modifications in which the invention might be embodied; the invention being measured by the appended claims and not by the details of the specification.

DESCRIPTION OF THE PREFERRED EMBODIMENT

Figure 1:
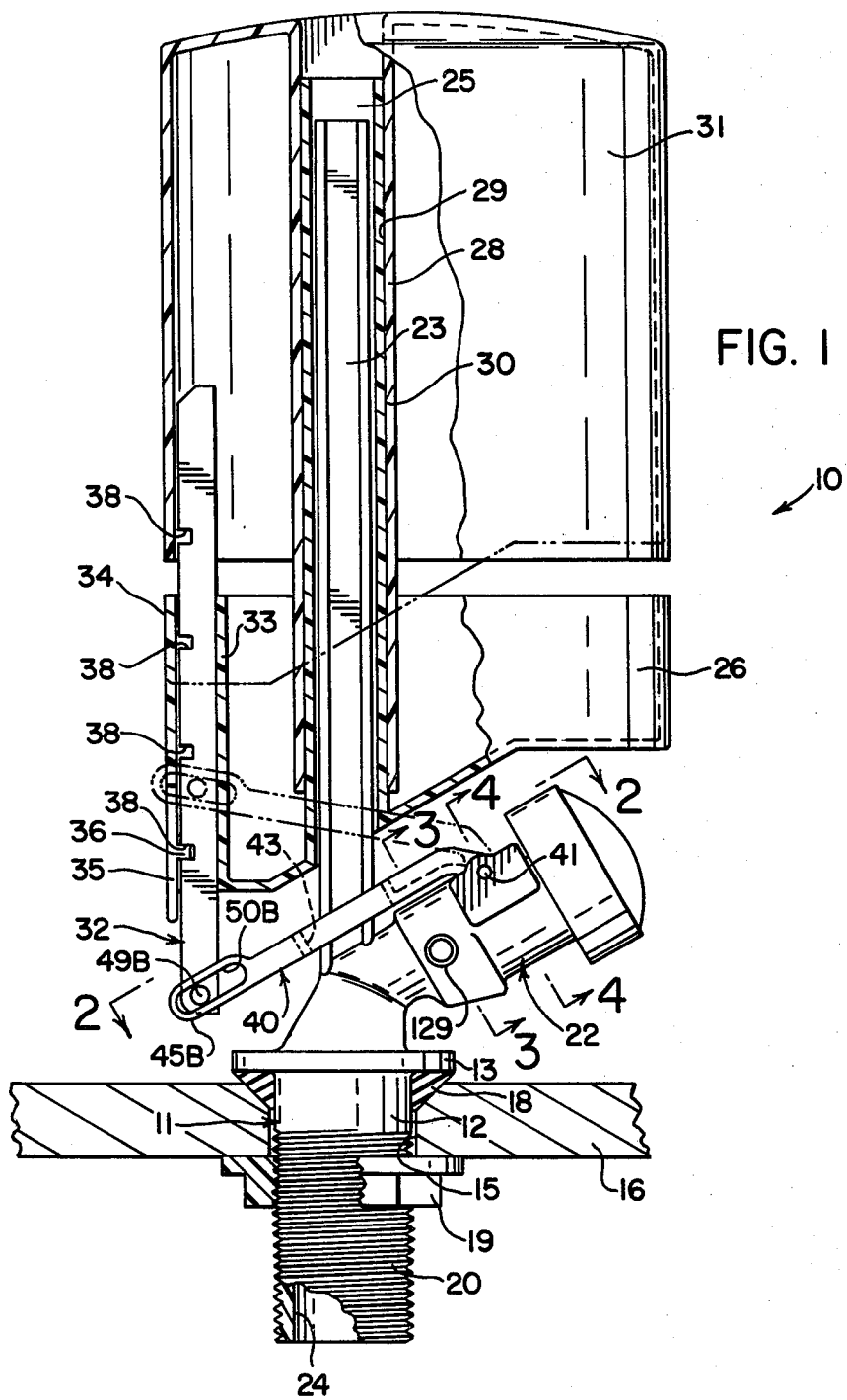
FIG. 1 is a side elevation, partly broken away, depicting a ballcock assembly embodying the concepts of the present invention, as mounted on the bottom wall of a flush tank.
Figure 2:
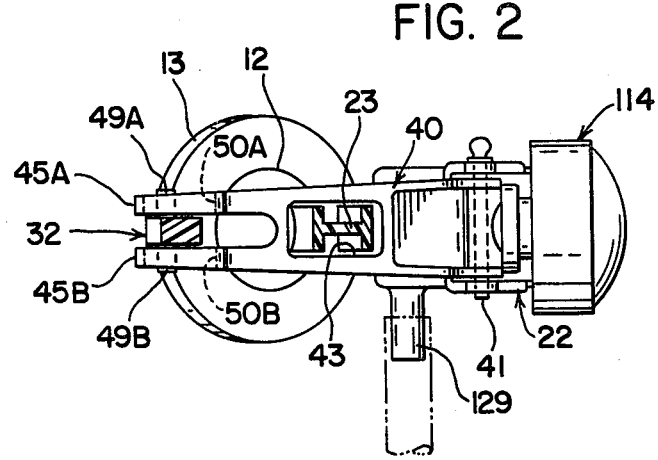
FIG. 2 is a virtually horizontal cross-sectional view taken substantially along line 2—2 of FIG. 1 and depicting the valve housing in top plan.
Figure 3:
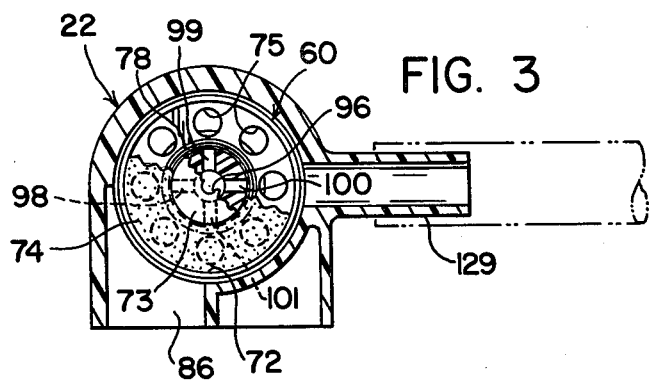
FIG. 3 is an enlarged, virtually horizontal cross-sectional view taken substantially on line 3—3 of FIG. 1 and partly broken away to depict the inter-relationship of the nozzle, the nozzle orifices, the washer and the head of the piston on the valve element as well as the passage ways through the piston by which the pressure differential to maintain the washer in situ is achieved.
Figure 4:
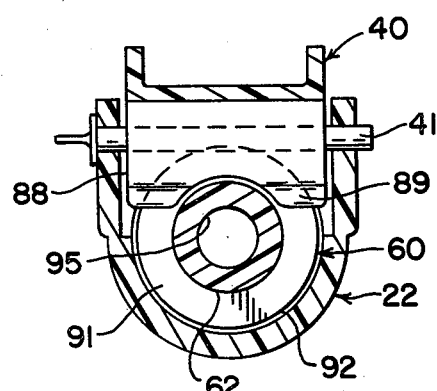
FIG. 4 is an enlarged, virtually horizontal cross-sectional view taken substantially on line 4—4 of FIG. 1 which depicts the fulcum mounting of the lever on the valve housing and the configuration of the resistance arm as it engages the valve element.

A representative configuration of a ballcock embodying the concept of the present invention is identified by the numeral 10 on the enclosed drawings.

The main body 11 of the ballcock 10 has a shank portion 12 at the lower extremity thereof. An abutment flange 13 extends radially outwardly from the periphery of the shank portion 12. The shank portion 12 provides the means by which the ballcock 10 may be installed within a flush tank. Specifically, the shank portion 12 may pass through an aperture 15 in the bottom wall 16 of the flush tank (not shown). The typical sealing gasket 18 is received between the abutment flange 13 and the wall 16 and is sealingly compressed to prevent leakage by tightening the mounting nut 19 along the threads 20 on the radially outer surface of the shank portion 12.

Upwardly of the abutment flange 13 a valve housing 22 obliquely intersects the shank portion 12 and a supporting pillar 23 extends vertically upwardly from the intersection of the valve housing 22 with the shank portion 12 to complete the body 11 of the ballcock 10.

An inlet passage 24 extends interiorly of the shank portion 12 and communicates with the interior of the valve housing 22. A water supply line, not shown, may be coupled to the threaded, open end of the shank portion 12 beneath the bottom wall 16 of the flush tank in the customary fashion selectively to permit the admission of water into the flush tank by virtue of the operation of the ballcock 10, as hereinafter more fully described.

A first collar 25 is freely slidable along the supporting pillar 23. The lower portion of the collar 25 is secured to a cup 26 which, in its operative environment, will remain filled with water as a counter weight to provide the initiating opening force to the hereinafter described valving mechanism of the ballcock 10.

A second collar 28 is received over the first collar 25. The interior surface 29 of the second collar 28 frictionally engages the outer surface 30 of the first collar 25 to permit the two collars to be selectively positioned manually, one with respect to the other, and to retain that relative position until specifically changed. A bell-like structure is secured to the uppermost extremity of the second collar 28 to serve as a float 31.

An actuating link 32 is operatively connected to the cup 26. A guideway 33 extends vertically along the sidewall 34 of the cup 26, and the actuating link 32 is slidably received therein.

A flexible tab 35 is formed in the sidewall 34 and presents a pawl 36 which is biased by the tab 35 to engage any one of the plurality of notches 38 recessed into the opposing face of the actuating link 32. By flexing the tab 35 one may select the notch 38 into which the pawl 36 will be received. In conjunction with the explanation as to the operation of the ballcock 10 it will become apparent as to how one determines into which notch 38 the pawl 36 should be received.

A first class lever 40 is pivotally mounted on a fulcrum pin 41 supported from the valve housing 22. To obviate eccentric loading to the effort arm 42, a rectangular opening 43 accommodates the supporting pillar 23 and permits the full range of motion to the effort arm 42 without interference between the effort arm 42 and the pillar 23.

Outwardly of the opening 43 the effort arm 42 of lever 40 terminates in a yoke 44, the arms 45A and 45B of which embrace the sides 46A and 46B, respectively, of the actuating link 32. A cross-head in the form of the pin 49 is affixed to and extends transversely outwardly from the sides 46A and 46B of the actuating link 32, and the projecting ends 49A and 49B of pin 49 are respectively received within slots 50A and 50B forming the cross-head guide in the yoke arms 45A and 45B of the effort arm 42. The length, and exact location, of the slots 50A and 50B are selected to permit accommodation of the linear motion of the actuating link 32 to the arcuate motion of the effort arm 42 through the full range of motion required by the lever 40 to initiate translation of the hereinafter described valve element 60.

Figure 7:
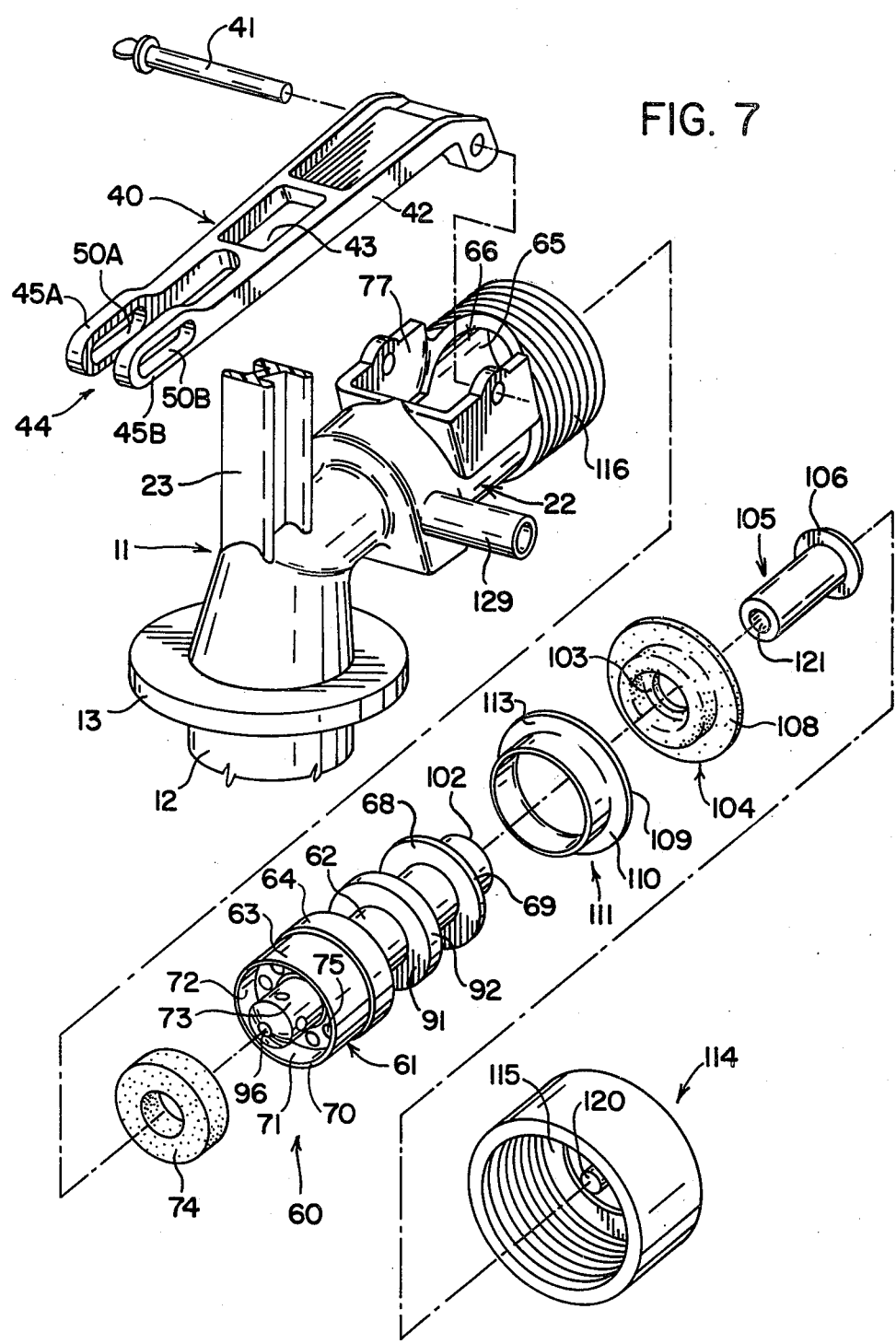
FIG. 7 is an enlarged, and exploded, perspective of a portion of the ballcock depicted in FIG. 1 with particular emphasis placed on the valve element and the components of the ballcock directly interacting therewith.
Figure 8:
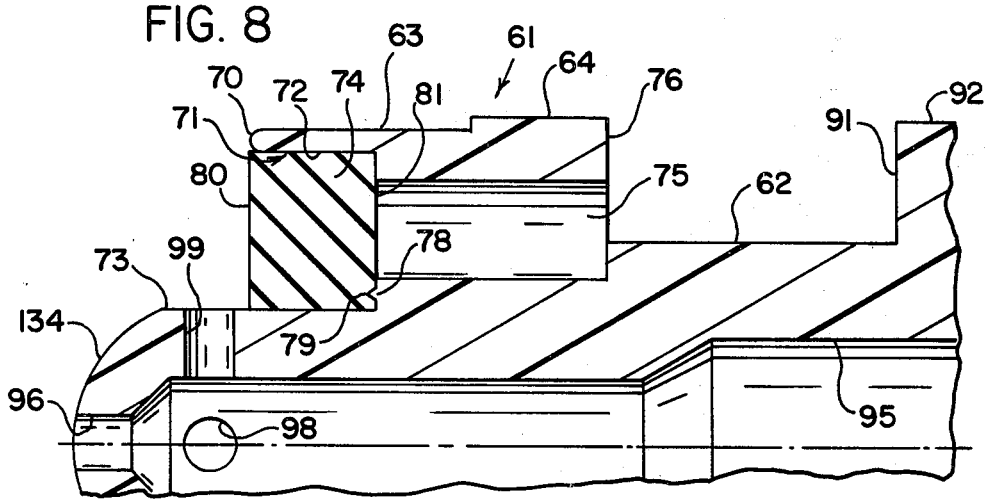
FIG. 8 is an enlarged, cross-sectional view through a portion of the valve element, depicting the nozzle, the piston and a section of the stem portion; and, FIG. 9 is an enlarged, substantially vertical, cross-sectional view through the valve housing.

The valve element 60 is perhaps most clearly depicted in FIG. 7. As depicted, the valve element 60 comprises a piston 61 secured to a stem portion 62. The outer cylindrical surface 63 of the piston 61 presents a radially enlarged bearing surface 64 adapted slidably to engage the cylindrical inner wall 65 of the piston chamber 66 within the valve housing 22.

Axially displaced from the piston 61 is a guide flange 68 which extends radially outwardly from the stem portion 62. The cylindrical outer surface 69 of flange 68 has an outer diameter that is approximately equal to but preferably a few thousandths of an inch (2 ½ thousands of a millimeter for every one thousandth of an inch) less than the outer diameter of the bearing surface 64 so that the surface 69 may also slidably engage the cylindrical wall 65. By minimizing the area of the bearing surfaces 64 and 69 frictional resistance against axial translation of the valve element 60 is thereby also minimized. The axial spacing of the bearing surfaces 64 and 69, together with their relative outer diameters, effectively stablizes the valve element 60 against wobble during operation of the ballcock 10 so that the movement of the valve element 60 is almost purely one of translation.

The head 70 of the piston 61 is preferably recessed, as at 71, to provide an annular skirt 72. A nozzle 73 extends coaxially beyond the head 70 and skirt 72 of the piston 61. An annular washer 74 engages the head 70 of the piston 61 and is received between the skirt 72 and the nozzle 73. The relative dimensions of the skirt 72, nozzle 73 and washer 74 are such that the nozzle 73 will extend axially beyond the washer 74 when the latter is received within the recess 71 provided in the head 70 of the piston 61. The skirt 72 engages the radially outer surface of the washer 74 and should preferably not extend axially therebeyond.

In view of the special functions to be performed by the nozzle 73, as hereinafter more fully explained, it is not convenient to secure the washer 74 to the nozzle 73 by virtue of a standard screw arrangement. Retention of the washer 74 can, however, be fully achieved by a novel alternative. As disclosed, retention can be achieved by providing a plurality of passageways 75 which open through the head 70 of the piston and vent through the rear face 76 thereof adjacent to the stem portion 62 into the ambient pressure of the environment. As is clearly depicted in FIGS. 5–7, the ambient pressure of the environment accesses the rear face 76 of the piston through the access port 77 in the valve housing 22.

It has been found that fluid, and particularly fluid under pressure, will tend to seep between the nozzle 73 and the washer 74 so that without the passageways 75 the washer 74 will actually be forced out of the recess 71 on the head of the piston. The passageways 75 tend to obviate this result by venting the majority of the water which does seep behind the washer 74.

To enhance the effectiveness of the passageways 75 an annular rib 78 is provided on the head 70 of the piston 61 which circumscribes the nozzle 73 but which is located radially inwardly of the plurality of the passageways 75 that open through the head 70. The apex 79 of rib 78 deforms the washer to impede the free passage of pressurized fluid thereacross. That fluid which does overflow the rib 78 is promptly vented through passageways 75, but the overwhelming disparity between the greater overall force of the fluid pressure acting against the face 80 of the washer 74 and the lesser overall force acting against the back surface 81 of the washer 74 retains the washer firmly within the recess 71 of the piston 61.

An annular seat 85 is formed within the valve housing 22. The seat 85 circumscribes the mouth of the inlet passage 24 as it opens into the interior of the valve housing 22 and either opens or closes the flow of water from the inlet passage 24 through the piston chamber 66 and out the exhaust port 86 in response to the selective translation of the valve element 60.

Translation of the valve element 60 is initiated by operation of the lever 40. The resistance arm 88 of the lever 40 presents generally opposed throw-lobes 89 and 90. The lobe 89 engages the rear face 76 of the piston 61 to initiate closure motion of the valve element 60 upon clockwise rotation of the lever 40 as viewed in FIGS. 1 and 5. Conversely, throw-lobe 90 engages the radially oriented camming surface 91 on the annular cam flange 92 which extends radially from the stem portion 62 of the valve element 60 in order to initiate the opening motion of the valve element 60 upon counter-clockwise rotation of the lever 40, as viewed in FIGS. 1 and 6. A more detailed explanation as to the actuation of the valve element 60 is hereinafter set forth in conjunction with the description as to the operation of the ballcock 10.

Continuing with the structural description of the valve element 60, a bore 95 extends axially through the valve element 60. The bore 95 opens through the nozzle 73 by virtue of an axial orifice 96 and one or more (four are depicted) radial orifices 98, 99, 100 and 101. The combined cross-sectional area of the radial orifices must, in any event, exceed the cross-sectional area of the axial orifice, and the cross-sectional area of the bore 95 must be at least equal to, and preferably exceed, the combined cross-sectional areas of the radial orifices. The opposite end of the bore 95 opens axially through the transverse end wall 102 of the stem portion 62.

The radially inner, planar mounting rim 103 of a rolling diaphragm 104 overlies the end wall 102 of the stem portion 62 radially outwardly of the bore 95. A diaphragm retaining rivet 105 is press fit into the bore 95 such that the mounting rim 103 of the diaphragm 104 is embracingly secured between the end wall 102 and the head 106 of the rivet 105.

The radially outer, planar mounting rim 108 of the rolling diaphragm 104 overlies the planar engaging surface 109 of the radial flange 110 on a support ring 111 that is rotatably supported on the end of the valve housing 22. As may be seen in FIGS. 5 and 6 the open end of the valve housing 22 is flared to present a bearing surface 112. The support ring 11 has a matingly contoured slide surface 113 which engages the bearing surface 112 so as to permit unfettered relative rotation of the support ring 111 with respect to the valve housing 22. By rotatably mounting the support ring 111 the rolling diaphragm 104 will not be damaged by tightening the end cap 114 onto the valve housing 22.

The end cap 114 has a planar clamping surface 115 that is oriented parallel to the planar, engaging surface 109 of the support ring 111. As the end cap 114 is screwed onto the threaded portion 116 of the valve housing 22 the mounting rim 108 of the rolling diaphragm 104 will be anchored between the engaging surface 109 and the clamping surface 115. Were the support ring 111 fixed with respect to housing 22, as the end cap 114 would be tightened, the mounting rim 108 of the rolling diaphragm 104 would be subjected to severe shear stresses resulting from the counter-rotation of the opposing surfaces which engage the mounting rim 108. Inasmuch as rolling diaphragms are generally made of a relatively lightweight fabric that is preferably coated with an elastomer, subjecting the mounting rim 108 to shear stresses incident to tightening the end cap 114 without using the unique support ring 111 can distort, or destroy, the diaphragm 104.

By interposing the support ring 111 between the mounting rim 108 of the diaphragm 104 and the valve housing 22, however, as the end cap 114 is tightened, the imposition of such shear stresses will be obviated because as soon as the mounting rim 108 tends to be gripped between the support ring 111 and the end cap 114, the support ring 111 will rotate with the end cap 114 as well as the valve element 60, which, is carried along with the rolling diaphragm 104 until the cap 114 is itself securely mounted onto the valve housing 22.

Figure 5:
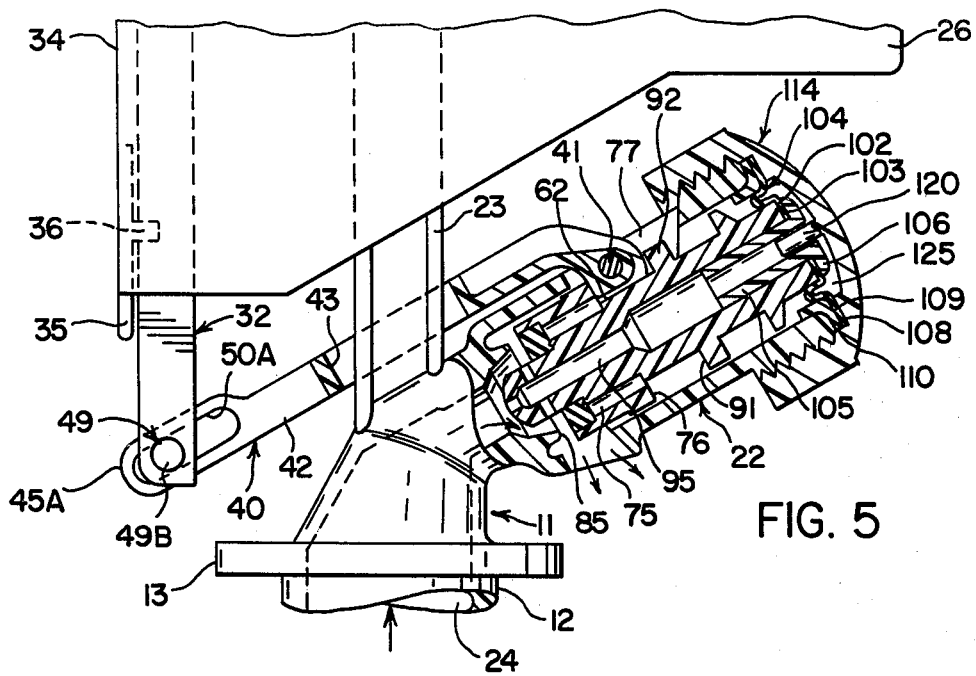
FIG. 5 is an enlarged area of FIG. 1 and partially broken away to depict the valve housing in vertical section, the valve element, and related mechanism, being disposed in the open position.
Figure 6:
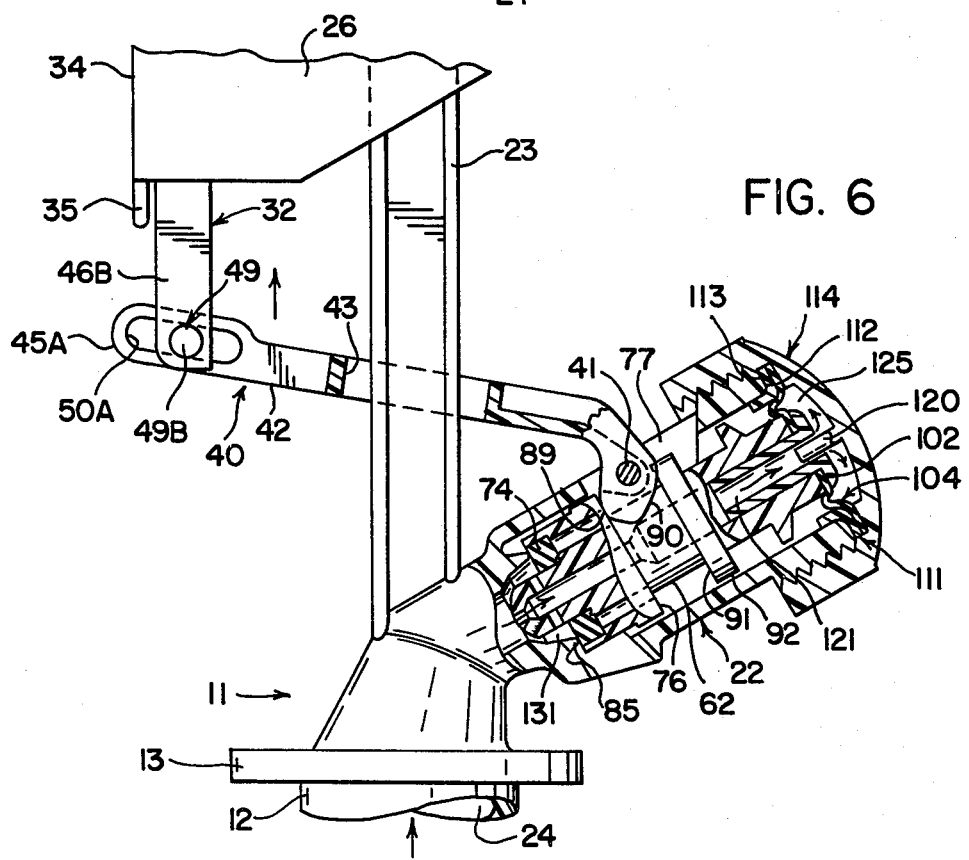
FIG. 6 is a view similar to FIG. 5 except that the valve element, and related mechanism, is disposed in the closed position.

As seen in FIGS. 5 through 7, the end cap 114 also presents a metering pin 120 which is insertably received within the bore 121 through the rivet 105. The outer diameter of the metering pin 120 is preferrably several thousandths of an inch less than the inner diameter of the bore 121 in order to effect a controlled flow of fluid therebetween.

OPERATION

Turning now to an operational description of the aforedescribed ballcock 10, it will be assumed that the flush tank is full of water and that the ballcock 10 is disposed in the closed position. This is designated by the chain-line representation of lever 40 in FIG. 1 and the entirety of FIG. 6. As such, the static closed position of the ballcock 10 will have the components disposed as follows.

The valve element 60 will be disposed with the washer 74 firmly pressed against the seat 85. In this position of the valve element 60, as depicted in FIG. 6, line pressure of the fluid in inlet passage 24 has been communicated through the orifices 96 and 98 through 101 in nozzle 73 along the bore 95 and past the metering pin 120 into the control chamber 125. With the line pressure in inlet passage 24 equal to the pressure of the fluid in control chamber 125, the relative areas against which this pressure is applied to the valve element 60 will determine the overall resultant force applied to the valve element 60.

The subject ballcock 10 has been designed to assure that the area of the control chamber 125 which applies pressure to the valve element 60 is in excess of the area of the inlet passage 24 which applies pressure to the valve element. In this way the line pressure will assist in maintaining the ballcock closed—i.e., the washer 74 will be maintained firmly against the seat 85. Reference to FIG. 6 will reveal that the circular area outlined by the rolling diaphragm 104, and the head 106 of the rivet 105, is greater than the circular area circumscribed by the engagement of the seat 85 with the washer 74. Accordingly, once the valve is closed, the buoyancy of the float 31 does not contribute to maintaining the ballcock closed unless the pressure in the inlet passage would drop close to zero. In that situation the action of the float 31 would maintain the ballcock in its closed position.

By sliding the collar 28 along the collar 25 one can vertically position the bell float 31 so that it will actuate the valve element 60 to close when the desired volume of water has been admitted to the flush tank. Further vertical adjustments of the cup 26, and the concomitant adjustment of float 31, will be described during the discussion pertaining to initiating the opening motion of the valve element 60.

During the flush cycle the ballcock 10 will remain closed until the water level within the flush tank drops sufficiently below the cup 26 so that the weight of the water within the cup located above the level of the receding water level within the flush tank—i.e., the counter weight—will be sufficient to initiate opening of the ballcock 10. At that point during the flush when the counter weight within cup 26 begins to rotate the lever 40 counter-clockwise (thus initiating movement of the valve element), the line pressure of the water within the inlet passage 24 will begin to flow past the seat 85 through the piston chamber 66 and out the exhaust port 86. As the velocity of this flow increases, the location of the orifices 98 through 101 in nozzle 73 reduce the pressure in bore 95 and thereby reduce the pressure in the control chamber 125. Additionally, as the valve element 60 moves off the seat 85 the line presssure within the inlet passage 24 is applied to the full area of the piston 61—i.e., applied to washer 74—rather than merely that area thereof circumscribed by seat 85. The full area of piston 61 is greater than the area of the control chamber 125 which applies pressure to the valve element. Thus, the hydraulic pressure within the inlet passage 24 dynamically assists in translating the valve element 60 to the fully opened position depicted in FIG. 5.

Accordingly, one should appreciate that the vertical disposition of the cup 26 will determine the time during the flush cycle when admission of the refill water is initiated. Thus, sequencing can be predetermined, or adjusted, by vertical disposition of the cup 26 along the actuating link 32, for which provision is made by engaging the pawl 36 with a predetermined notch 38. It should be remembered, however, that the float 31 will move with the cup 26 so that as the height of the cup 26 is adjusted a concomitant, but independent, change must be made to the height of the float 31, as explained above.

Once the ballcock has been opened, it will remain open until the flush valve closes and the level of the water in the flush tank rises to the level where the float 31 will begin to rotate the lever 40 in a clockwise direction—i.e., from the position depicted in FIG. 5 to that depicted in FIG. 6.

As the valve element moves from the open position (FIG. 5) to the closed position (FIG. 6), the venturi effect lessens at the orifices 96 and 98 through 100. Thus, the pressure at those orifices increases causing the fluid pressure in passageway 95 and control chamber 125 to increase. As the valve element 60 moves into its closed position the area of the piston 61 against which the line pressure within the inlet passage 24 acts is being reduced. This further enhances closing movement of the valve element. Thus, without the metering pin 120 the valve element 60 moves so rapidly to the closed position that rather serious water hammer is induced. In order to delay the rapidity of this closure, and thereby preclude water hammer, the bore 95 is partially obstructed by use of the metering pin 120.

In the environment within which a ballcock would be used, the line pressures can vary from as low as about 10 to 20 pounds per square inch to as high as 125 to 150 pounds per square inch. It has been found that when the internal diameter of the bore 121 is on the order of approximately 0.096 inches (0.0244 mm) the outer diameter of the metering pin 120 should be on the order of approximately 0.093 inches (0.0236 mm). This differential is sufficient to extend the period of the closure motion of the valve element 60 on the order of approximately one half a second, and that delay, it has been found, will preclude water hammer over the range of pressures normally anticipated for the environment with which the ballcock 10 would normally be expected to be used.

A bowl fill tube, not shown, may be attached to the tubular stub 129 projecting from the side of the valve housing 22 to conduct some water to the toilet bowl as the flush tank is being filled in order to maintain a small reservoir in the bowl in order to prevent the escape of gases from the sanitary system.

The ballcock 10 disclosed herein possesses a very compact configuration and can, therefore, be readily adapted to various tank configurations. This compact configuration is exemplified by the fact that the prior art ballcock normally employs a ball float which possesses 2 to 2½ pounds (0.91 to 1.135 kg) of buoyancy to actuate the historic valving mechanism. The subject ballcock requires only approximately 10 ounces (284 gm) of buoyancy.

In addition, prior art ballcocks normally secure the flotation ball float at the end of a lever arm in excess of 8 inches (20.3 cm) so that the moment arm is equal to approximately 12 inches (30.5 cm). By comparison, the moment arm utilized by the subject ballcock need only be about 2 inches (5.08 cm) in length.

These two features alone permit a very compact arrangement for the ballcock 10 so that it can be readily employed in a wide variety of flush tanks without requiring the installer to vary the length and/or disposition of the lever arm in order to accommodate the ballcock to various tank sizes and to various locations of the flush valve or other components within the flush tank.

During the discussion relating to the translation of the valve element 60, it was explained that the differential pressure applied against the valve element 60 as a result of the venturi effect augmented translation of the valve element initiated by operation of lever 40. The details as to one configuration by which the aforesaid venturi effect can be achieved are as follows.

Figure 9:
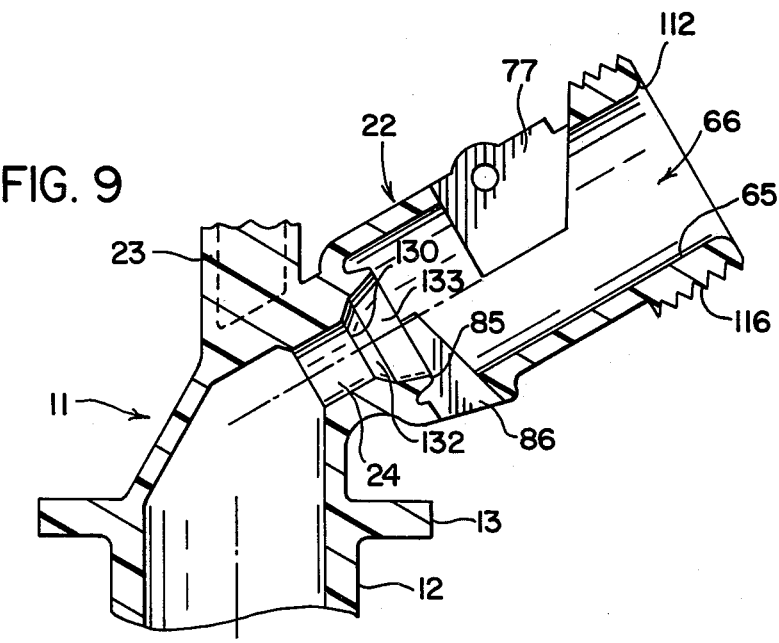

The inlet passage 24 flares as it opens into the piston chamber 66 provided within the valve housing 22. In fact, it is preferred that the inlet passage 24 at the mouth 130 of the valve housing as best see in FIG. 9, be of lesser diameter than the outer diameter of the nozzle 73 and then flare sufficiently so that the flare, the seat 85 and the nozzle 73 cooperate, with the washer 74 to provide the venturi action necessary properly to effect the pressure sequence required in the control chamber 125.

Although it should be very apparent to those skilled in the art that the required venturi effect can be created with a veritable host of dimensional variations, the following description will delineate the exact configuration of just one exemplary arrangement known to operate effectively and thereby serve either as a pattern for those who do not wish to experiment or as a bench mark for those who do.

In the exemplary arrangement the mouth of the inlet passage is approximately 0.23 inches (5.85 mm) in diameter, and the inner wall of the piston chamber 66 flares radially outwardly from the mouth 130 to provide an expanded volume for a feeder chamber 131. The expansion may be accomplished by a step series of truncated conical sections 132 and 133 which flare at approximately 45 degrees, and the axial extent of section 132 may be approximately 0.062 inches (1.57 mm).

Section 133, which adjoins section 132, may flare at an angle of approximately 30 degrees from an axial reference. Section 133 may extend axially approximately 0.125 inches (3.175 mm) and terminate in the seat 85.

The nozzle 73 may project approximately 0.136 inches (3.455 mm) beyond the washer 74 and have an outer diameter of approximately 0.25 inches (6.35 mm) to terminate in a spherical surface 134 having a radius of approximately 0.14 inches (3.55 mm).

The radial orifices 98, 99, 100 and 101 open tangentially past the washer 74, and the radial orifices, as well as the axial orifice 96, may all be approximately 0.055 inches (1.4 mm) in diameter.

Next, it should be appreciated that the axial translation of the valve element 60 need only be on the order of 1/16 of an inch (1.66 mm) between its fully opened and its fully closed position.

In its fully opened position the flow of water from the feeder chamber 131 past the constriction formed between the seat 85 and the washer 74 creates a venturi effect in proximity to the radial orifices 98, 99, 100 and 101 which reduce the pressure within the control chamber 125 hydraulically to maintain the ballcock in its opened position.

As the valve element 60 is moved toward the closed position the pressure reduction effected by the venturi action has less effect on the orifices 98 through 101. In fact, it has been found that when the washer is approximately 1/64 of an inch (0.3965 mm) from the valve seat 85, the pressure adjacent to the orifices 98 through 101 begins to increase, and this, of course, is transmitted to the control chamber 125. To delay the transmission of this pressure build-up within the control chamber 125 it is desirable to employ the aforedescribed metering pin 120 which is insertably received within the bore 121 through the rivet 105.

In addition, it has been found that the axial orifice 96 tends to reduce the pressure differential between the control chamber 125 and the feeder chamber 131. Without the orifice 96 when the ballcock 10 is fully opened a greater force is required to overcome this pressure differential and initiate closure. This greater force would be provided automatically because the float would simply displace more water within the fluid tank before translation of the valve element 60 would be initiated. When the pressure of the fluid adjacent to the orifices 98 through 101 begins to increase as the valve element 60 is translated toward the closed position the excessive mechanical force applied by the float to initiate translation of the valve element is now applied to drive the valve element closed with the attendant water hammer.

The axial orifice 96 obviates this undesirable result, and one can experiment with the inner diameter of the orifice 96 to provide the desired regulation of the pressure within the control chamber 125 even as the ballcock remains fully opened. Hence, the radial orifices 98 to 101 are the means by which pressure is reduced within the control chamber 125. The axial orifice 96 is the means by which that pressure differential is regulated and the metering pin 120 is the means which controls the period of time during which the change in pressure within the control chamber 125 is accomplished.

When the ballcock is closed, the line pressure is communicated to the control chamber 125 through any and all orifices 96 and 98 through 101, and the force required to be overcome to initiate opening is simply that achieved by the differential areas projected by the rolling diaphragm and the head of the piston. This pressure differential thus hydraulically maintains the static, closed position, as in many prior art arrangements, but once the dynamic operation begins, the present arrangement far surpasses any known prior art configuration.

Of particular importance is the fact that an arrangement embodying the concept to the present invention will provide effective, and wholly satisfactory, operation over a wide range of operating pressures. In this regard the exemplary configuration hereinbefore described will permit the ballcock to operate with equal facility in conjunction with the supply line in which the pressures range from approximately 10 to approximately 150 pounds per square inch.

It should, therefore, now be apparent to those skilled in the art that a ballcock embodying the concept of the present invention fully accomplishes the objects of the invention.

We claim:

1. A ballcock for a flush tank comprising: a body having a shank portion and a valve housing, said shank portion adapted to pass through a wall of the flush tank for connection to a supply line; an inlet passage communicating between the said shank portion and said valve housing; an exhaust port penetrating said valve housing; a valve seat presented within said valve housing, to surround said inlet passage as it communicates with said valve housing, and located between said exhaust port and said shank portion; a valve element having a piston secured to a stem portion and received within said valve housing for translational movement; a control chamber by which to effect the application of fluid pressure axially against the stem portion in opposition to the pressure applied on said piston by the fluid being controlled; float means operatively connected to said valve element for initiating translational movement thereof; a washer carried by said piston and adapted sealingly to engage or disengage from the valve seat in response to the translational movement of said valve element to close and open the ballcock, respectively; a nozzle projecting through said washer and disposed within the perimeter of said valve seat to communicate continually with said inlet passage; a bore extending axially of said piston and stem portions; and, at least one orifice means opening radially through said nozzle on the inlet passage side of said washer and communicating with said axial bore through said piston and stem to effect communication between the said inlet passage and said control chamber, said orifice means opening radially through said nozzle in sufficient proximity to the flow between said washer and said valve seat to communicate the venturi effect, which is created by said flow between said washer and valve seat, through said orifice means to said control chamber whereby to reduce the pressure in said control chamber and thereby hydraulically assist in translating the valve element during both its opening and closing movements.

2. A ballcock, as set forth in claim 1, in which said radial orifice means open through the nozzle in close proximity to the fluid flow between the said washer and said seat in order that the venturi effect created by such fluid flow will reduce the pressure of the fluid at the radial orifices during a substantial portion of the distance through which the valve element translationally moves.

3. A ballcock, as set forth in claim 2, in which said washer has a back surface which engages said piston; at least one passageway is provided through said piston, one end of said passageway opening through said piston to communicate with the back surface of said washer; and, the other end of said passageway communicating with the ambient pressure surrounding said valve housing.

4. A ballcock, as set forth in claim 1, in which a pillar extends vertically upwardly from said shank portion, a first collar means slidably received on said pillar; a counter weight secured to said first collar means; a second collar means frictionally engaging said first collar means; a float received on said second means; a lever arm to initiate movement of said valve element, said lever arm being operatively connected to said float.

5. A ballcock, as set forth in claim 4, in which said lever arm is pivotally mounted on said valve housing; said lever having a resistance arm operatively to engage said valve element and an effort arm: said effort arm being operatively connected to said float.

6. A ballcock, as set forth in claim 5, in which the operative connection to said float comprises: an actuating link connected to said counter weight; and, means connecting said actuating link to the effort arm of said lever by which to accommodate the linear motion of said actuating link to the arcuate motion of said effort arm.

7. A ballcock, as set forth in claim 6, in which means are provided adjustably to connect said actuating link to said counter weight.

8. A ballcock, as set forth in claim 7, in which the means adjustably to connect said actuating link to said counter weight comprises: a pawl carried on said counter weight and selectively received within one of a plurality of notches presented from said actuating link.

9. A ballcock, as set forth in claim 6, in which said counter weight comprises a cup which retains environmental water to operate as a counter weight.

10. A ballcock, as set forth in claim 9, in which said float comprises: a bell which captures air as the water level rises therearound.

11. A ballcock, as set forth in claim 1, in which means are provided to restrict the flow of fluid through the bore extending axially of said piston and stem portion into said control chamber.

12. A ballcock, as set forth in claim 11, in which the valve housing has an open end through which the valve element is insertably received; an end cap is demountably secured to the open end of said valve housing; a metering pin is presented from said end cap and is insertably received within the bore extending axially of said piston and stem portion to control the period of time within which the fluid pressure in said bore will be reflected within said control chamber.

13. A ballcock, as set forth in claim 12, in which a rolling diaphragm is secured between the valve element and the valve housing to define, in combination with said end cap, the control chamber.

14. A ballcock, as set forth in claim 12, in which the rolling diaphragm is provided with a radially inner and a radially outer, planar mounting rim; said radially inner mounting rim being secured to the stem of said valve element and the radially outer mounting rim being secured between said end cap and said valve housing.

15. A ballcock, as set forth in claim 14, in which an annular support ring is rotatably carried on the stem portion of said valve element; the radially outer mounting rim of said rolling diaphragm overlies said supporting ring; a surface on said end cap clamps said radially outer mounting rim to the support ring as the end cap is tightened onto said valve housing.

16. A valve, as set forth in claim 1, in which a rivet is received within the end of the first bore opening through the stem portion of said valve element; said rivet having a head; the radially inner mounting rim on said rolling diaphragm being embracingly engaged between said rivet head and the stem portion of said valve element; a second bore extending axially through said rivet; said second bore communicating with said first bore; and, said metering pin being insertably received within the said second bore.

* * * * *